(12) United States Patent
Morris et al.

(10) Patent No.: US 6,942,445 B2
(45) Date of Patent: Sep. 13, 2005

(54) GAS TURBINE COOLED SHROUD ASSEMBLY WITH HOT GAS INGESTION SUPPRESSION

(75) Inventors: Mark C. Morris, Phoenix, AZ (US); William J. Howe, Chandler, AZ (US); George E. Zurmehly, Phoenix, AZ (US); Alan G. Tiltman, Fountain Hills, AZ (US); George W. Wolfmeyer, Tempe, AZ (US); John F. Sciacca, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 148 days.

(21) Appl. No.: 10/729,695

(22) Filed: Dec. 4, 2003

(65) Prior Publication Data

US 2005/0123389 A1 Jun. 9, 2005

(51) Int. Cl.[7] ............................................. F01D 11/08
(52) U.S. Cl. ........................ 415/1; 415/173.1; 415/175
(58) Field of Search ...................... 415/1, 173.1, 173.6, 415/144, 175

(56) References Cited

U.S. PATENT DOCUMENTS

| 3,318,573 | A | * | 5/1967 | Matsuki et al. ............... 416/91 |
| 4,157,232 | A | | 6/1979 | Bobo et al. |
| 4,271,666 | A | | 6/1981 | Hurley et al. |
| 4,311,431 | A | * | 1/1982 | Barbeau ................... 415/173.6 |
| 4,573,866 | A | | 3/1986 | Sandy, Jr. et al. |
| 4,582,467 | A | | 4/1986 | Kisling |
| 5,142,859 | A | | 9/1992 | Glezer et al. |
| 5,165,847 | A | | 11/1992 | Proctor et al. |
| 5,169,287 | A | | 12/1992 | Proctor et al. |
| 5,188,506 | A | | 2/1993 | Creevy et al. |
| 5,224,822 | A | | 7/1993 | Lenahan et al. |
| 5,545,004 | A | | 8/1996 | Ho et al. |
| 5,584,651 | A | | 12/1996 | Pietraszkiewicz et al. |
| 5,993,150 | A | | 11/1999 | Liotta et al. |
| 6,116,852 | A | * | 9/2000 | Pierre et al. ................. 415/115 |
| 6,139,257 | A | | 10/2000 | Proctor et al. |
| 6,354,795 | B1 | | 3/2002 | White et al. |
| 6,471,216 | B1 | | 10/2002 | Brainch et al. |
| 6,481,959 | B1 | | 11/2002 | Morris et al. |

* cited by examiner

*Primary Examiner*—Ninh H. Nguyen
(74) *Attorney, Agent, or Firm*—Robert Desmond, Esq.

(57) ABSTRACT

A cooled shroud assembly includes an angled slot and a plurality of dilution jet openings. The shroud forward cavity is modified such that at least one recirculation zone is produced. The angled slot forces an axial change in momentum of the hot gas flow and increases radial and axial pressure variation attenuation. The cooled shroud assembly isolates the shroud structure and seals from the hot flow path and a cooling flow from the dilution jet openings dilutes the hot gas flow. A series of recirculation zones shields the shroud carrier and high pressure seals from the hot gas flow.

28 Claims, 7 Drawing Sheets

GAS TURBINE COOLED SHROUD ASSEMBLY WITH HOT GAS INGESTION SUPPRESSION

BACKGROUND OF THE INVENTION

The present invention generally relates to gas turbine engine systems and, more particularly, to gas turbine cooled shroud assemblies.

Turbine shroud assemblies have been used extensively in gas turbine engines. The turbine shroud assembly may be positioned immediately downstream of a high pressure turbine (HPT) nozzle. The turbine shroud assembly may surround a HPT rotor and may define an outer boundary of a high temperature gas flow path through the HPT. During engine operation, exposure to the high temperature gas flow may result in failure of the turbine shroud components. Due to the differing expansion of rotor and turbine shroud assembly components, it may also result in contact between the turbine shroud assembly and the blade tips of the rotor. A small amount of cooling air from a compressor may be used to decrease some of the adverse effects of the high temperature gas flow.

Minimizing the amount of air necessary to cool the turbine shroud assembly is desirable because engine efficiency decreases as the amount of cooling air increases. Methods for minimizing the cooling air necessary may include decreasing cooling air leakage from the assembly or reducing the cooling needs of the system by increasing the effectiveness of the cooling scheme.

Turbine shroud assemblies have experienced significant distress due to a lack of robust sealing of the assembly. This leakage may result in a significant reduction in the cooling cavity pressure (and back flow margin), which can result in hot gas ingestion and distress in the hardware. Back flow margin is the ratio of the difference between the shroud cooling cavity pressure and the flow path pressure to the flow path pressure. If the back flow margin of the assembly becomes negative (or for some designs even a low positive number), hot flow path gas may ingest into portions of the shroud and can cause significant distress. One challenge in maintaining good back flow margin is due to the difficulty in sealing the various leak paths that allow the cooling air to escape from the shroud cooling cavity.

Several methods of reducing cooling air leakage have been disclosed. These methods include the use of metallic feather type seals and metallic platform seals. Unfortunately, platform seals are not suitable for some applications, and the metallic feather seals, which are secured in machined grooves in the sides of the segments, may fail in the operating environment of some engines. In addition, assembly technicians may cut themselves on the small, sharp metallic platform seals.

Methods of reducing system cooling needs have also been disclosed. Manufacturing the assembly components from more robust materials and utilizing Thermal Barrier Coatings (TBC) have been described. Designs that utilize TBCs to keep the shrouds insulated from the hot flow path gas can experience delamination of the TBC, which in turn results in shroud distress. The shroud distress can result in large turbine blade tip clearances. The subsequent increase in turbine blade tip clearance increases fuel consumption and also results in an increase in turbine inlet temperature, which further distresses the hardware.

Methods of increasing the effectiveness of cooling configurations have been disclosed. In one method complex arrays of film cooling holes have been drilled into shroud segments. Although, this results in increased cooling of the turbine shroud assembly, all edges of the shroud segments may not be sufficiently cooled and system integrity may suffer.

Turbine shroud assemblies having increased cooling of the shroud segment edges have been disclosed. One such disclosure utilizes an interlocking hook/shelf on the ends of the segments in conjunction with conventional feather seals and slots to produce an end gap seal between the adjacent circumferential segments. In addition, this disclosure uses film cooling holes to reinforce cooling at the sides of the segment. Although, cooling of the shroud segment edges is increased, the metallic feather seals may suffer distress at higher operating temperatures due to hot gas ingestion, resulting in a loss of back flow margin to the assembly.

Turbine shroud assemblies having reduced hot gas ingestion have been disclosed in U.S. Pat. No. 4,573,866. These assemblies utilize pin fins to cool the shroud segments and incorporate sheet metal seals and bellows seals to reduce cooling flow leakage. A cooling flow is used to pressurize the area around the shroud segment sides. A feather seal and a tongue-and-groove interlocking feature for adjacent segments are also utilized. Although this results in a reduction of hot gas ingestion at the sides of the segments, hot gas ingestion at the shroud forward and aft cavities may not be sufficiently reduced.

Shroud cooling assemblies having improved cooling of the aft C-clip have been disclosed in U.S. Pat. No. 6,139,257. Cooling holes are formed in the aft rail of the shroud segments to impingement cool the aft corners of the shroud and to pressurize the aft cavity between the base of the shroud segment and the C-clip. Although hot gas ingestion and consequent overheating of the aft corners of the shroud may be reduced, assemblies having further reductions in hot gas ingestion are needed.

As can be seen, there is a need for improved turbine shroud assemblies. Additionally, turbine shroud assemblies are needed wherein hot gas flow ingestion is decreased. Further, assemblies are needed wherein cooling air flow is minimized while allowing for increased gas flow temperatures. Assemblies are needed wherein hot gas ingestion at the shroud forward and aft cavity is reduced. Moreover, turbine shroud assemblies having increased cooling to the high pressure seals and the shroud hangers are needed.

SUMMARY OF THE INVENTION

In one aspect of the present invention, a cooled shroud assembly for a turbine engine comprises a recirculation cavity capable of recirculating a flow therein, the recirculation cavity positioned radially outward from a hot gas flow path through the turbine engine; at least one dilution jet opening in flow communication with the recirculation cavity; and an angled slot positioned radially inward from the recirculation cavity, the angled slot in flow communication with the recirculation cavity and the hot gas flow path.

In another aspect of the present invention, an apparatus for a turbine engine comprises a hot ingestion gas zone cavity positioned radially outward from a hot gas flow path through the turbine engine; at least one warm middle zone cavity positioned radially outward from and in flow communication with the hot ingestion gas zone cavity; a cool upper zone cavity positioned radially outward from and in flow communication with at least one warm middle zone cavity; an angled slot positioned radially inward from the hot ingestion gas zone cavity, the angled slot in flow communication with the hot ingestion gas zone cavity and the hot gas flow path; and a plurality of dilution jet openings positioned radially outward from the angled slot and in flow communication with at least one warm middle zone cavity.

In still another aspect of the present invention, an assembly for a high pressure turbine (HPT) shroud comprises a recirculation cavity having a hot ingestion gas zone cavity, a warm middle zone cavity, and a cool upper zone cavity, the recirculation cavity positioned radially outward from a hot gas flow path through the HPT; a plurality of dilution jet openings positioned aft of and in flow communication with the recirculation cavity; and an angled slot in flow communication with the recirculation cavity and the hot gas flow path, the angled slot positioned radially inward from the recirculation cavity.

In yet another aspect of the present invention, a turbine shroud assembly for a turbine engine having a plurality of airfoils comprises a hot ingestion gas zone cavity positioned radially outward from a hot gas flow path through the turbine engine; a warm middle zone cavity positioned radially outward from and in flow communication with the hot ingestion gas zone cavity; a cool upper zone cavity positioned radially outward from and in flow communication with the warm middle zone cavity; an angled slot positioned radially inward from the hot ingestion gas zone cavity, the angled slot in flow communication with the hot ingestion gas zone cavity and the hot gas flow path, the angled slot having a slot angle between about 200 and about 600; and a plurality of dilution jet openings positioned radially outward from the angled slot and in flow communication with the warm middle zone cavity, at least one said dilution jet opening positioned circumferentially in line with a trailing edge wake of each airfoil, and wherein a distance between a flow exit end of each dilution jet opening and the hot ingestion gas zone cavity is at least about 0.20 inches.

In a further aspect of the present invention, a method of shielding a turbine engine from a hot gas flow path there through comprises the steps of providing a hot ingestion gas zone cavity radially outward from the hot gas flow path; positioning at least one dilution jet opening in flow communication with a shroud cooling cavity of the turbine engine and the hot ingestion gas zone cavity, such that flow recirculation is induced within the hot ingestion gas zone cavity during operation of the turbine engine; and positioning an angled slot between and in flow communication with the hot ingestion gas zone cavity and the hot gas flow path.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides gas turbine cooled shroud assemblies and methods for producing the same. The cooled shroud assemblies produced according to the present invention may find beneficial use in many industries including aerospace and industrial applications. The cooled shroud assemblies of the present invention may be beneficial in applications including electricity generation, naval propulsion, pumping sets for gas and oil transmission, aircraft propulsion, automobile engines, and stationary power plants. This invention may be useful in any gas turbine engine application.

In one embodiment, the present invention provides a gas turbine cooled shroud assembly with hot gas ingestion suppression for a gas turbine engine. The gas turbine engine may have a cavity forward of the shroud segments, the shroud forward cavity. During engine operation, the shroud forward cavity may ingest a hot gas flow from the hot gas flow path. The ingested hot gas flow may be detrimental to engine components radially outward from the shroud segments, such as shroud carriers and stator retainers. Unlike the prior art, the present invention may comprise a recirculation cavity and a dilution jet opening which is recessed axially from the recirculation cavity. The recirculation cavity in combination with a cooling flow from the dilution jet opening may trap the ingested hot gas flow near the hot gas flow path and may dilute the hot gas flow, reducing the temperature of the ingested hot gas flow. The cooled shroud assembly may further comprise an angled slot positioned between the shroud segment leading edge and the stator outer endwall trailing edge. The angled slot forces an axial change in momentum of the ingested hot gas flow and allows for greater attenuation of the circumferential static pressure variation in the shroud forward cooling cavity which results from a circumferential static pressure variation in the hot flow path due to the stator airfoil trailing edge wakes.

Figure 1:
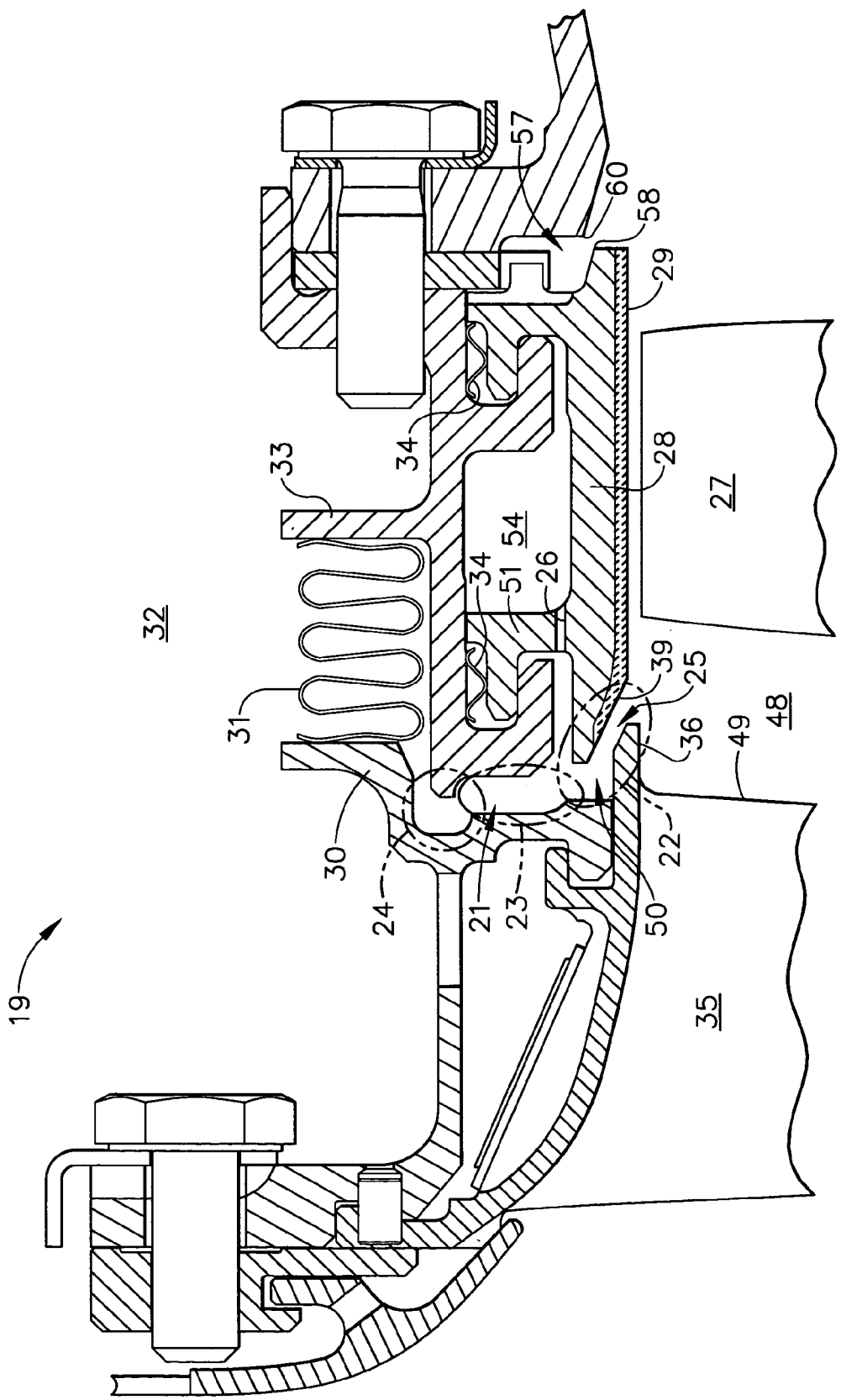
FIG. 1 is a cross sectional view of a cooled turbine shroud assembly according to one embodiment of the present invention.

As seen in FIG. 1, a cooled turbine shroud assembly 19 may comprise a recirculation cavity 21, an angled slot 25, a dilution jet opening 26, a turbine blade 27, a shroud segment 28, a thermal barrier coating (TBC) 29, a stator retainer 30, a convoluted high pressure seal 31, a combustor plenum 32, a shroud carrier 33, a wave seal 34, a stator airfoil 35, and a stator aft flow discourager 36. As better seen in FIG. 2, a cooled turbine shroud assembly 19 may comprise an angled slot 25, a recirculation cavity 21, and a dilution jet opening 26. The recirculation cavity 21 may comprise a hot ingestion gas zone cavity 22, a warm middle zone cavity 23, and a cool upper zone cavity 24.

During engine operation, a hot gas flow 37 from a hot gas flow path 38 may pass through the angled slot 25 and into the hot ingestion gas zone cavity 22. A dilution jet cooling flow 40 may exit the dilution jet opening 26 and enter the recirculation cavity 21. A dilution jet cooling flow 40 may contact a surface modification 55 to produce a first portion dilution jet cooling flow 41 and a second portion dilution jet cooling flow 42. The first portion dilution jet cooling flow 41 may enter the hot ingestion gas zone cavity 22; the second portion dilution jet cooling flow 42 may enter the warm middle zone cavity 23. The first portion dilution jet cooling flow 41 may swirl together and recirculate with the hot gas flow 37 entering the hot ingestion gas zone cavity 22, reducing the temperature of the hot gas flow 37 and trapping the hot gas flow 37 near the hot gas flow path 38. The second portion dilution jet cooling flow 42 may recirculate within the warm middle zone cavity 23, further reducing the temperature of the hot gas flow 37 within the hot ingestion gas zone cavity 22 and shielding engine components, such as shroud carriers 33, from the hot gas flow 37. A seal leakage cooling flow 43 from a high pressure seal, such as a convoluted high pressure seal 31, may enter and recirculate within the cool upper zone cavity 24. The recirculating seal leakage cooling flow 43 may shield the high pressure seal from the hot gas flow 37, reducing seal distress.

Figure 2:
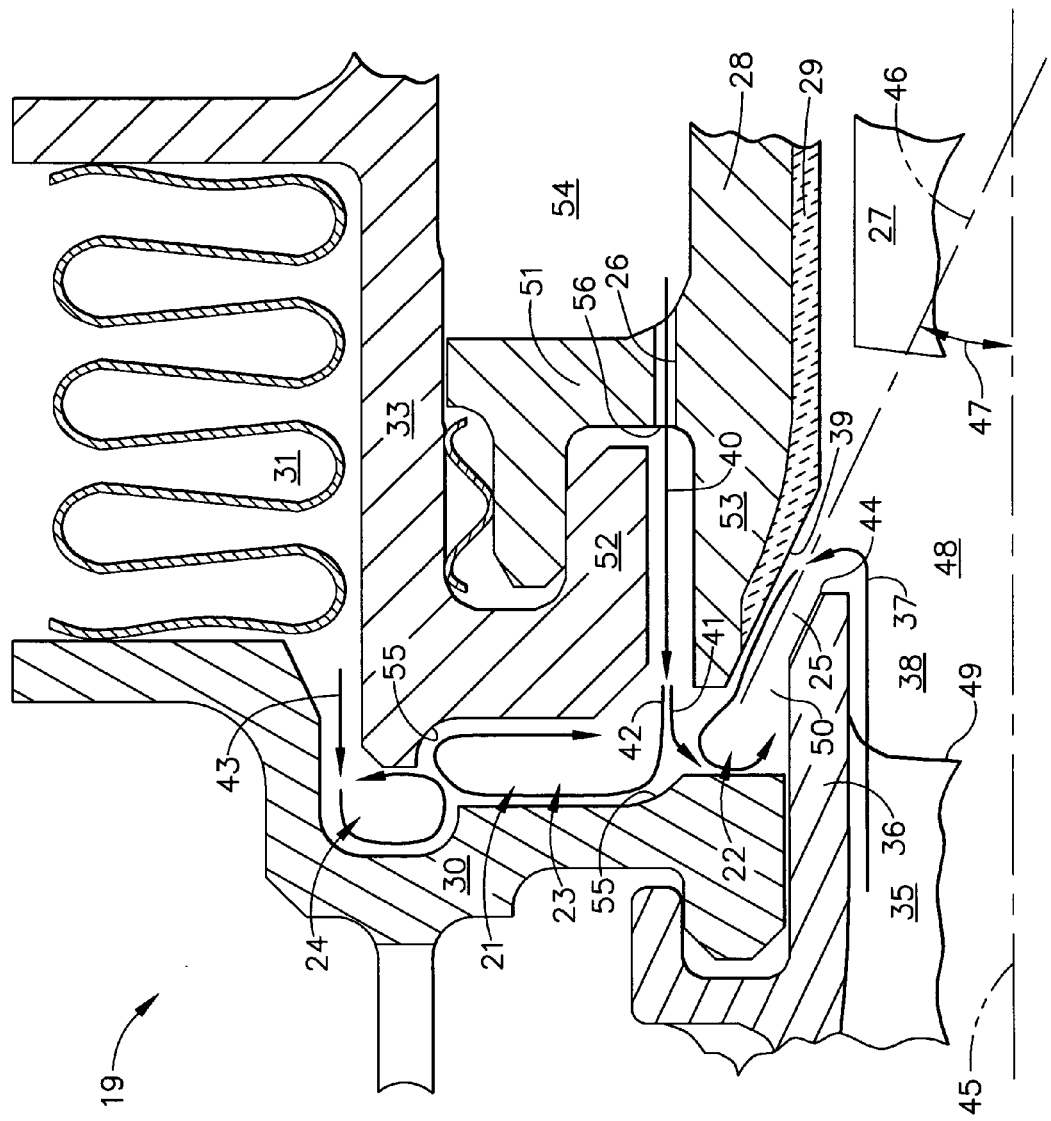
FIG. 2 is a close-up view of FIG. 1 showing flow patterns according to one embodiment of the present invention.

The angled slot 25, as shown in FIG. 2, may be positioned between a turbine stator outer endwall trailing edge 44 and a leading edge 39 of the shroud segment 28. In one embodiment, the angled slot 25 may be forward of the shroud segments 28. In a second embodiment, the angled slot 25 may be aft of the shroud segments 28. For example, the angled slot 25 may be positioned between a turbine duct outer endwall leading edge 60 and a trailing edge 58 of the shroud segment 28 as shown in FIG. 1. The angled slot 25 may be provided by known manufacturing methods and may be provided during fabrication of the shroud segments 28 and the stator aft flow discourager 36. The dimensions of a useful angled slot 25 may vary with engine design and application. A useful angled slot 25 may accommodate the relative motion of the assembly components and may accommodate a cooling flow exiting the shroud forward cavity 50. An axial engine centerline axis 45 and a line 46 through the angled slot 25 may define a slot angle 47. A useful slot angle 47 may vary with application, may accommodate axial/radial excursion, and may allow flow passage during engine operation. Other factors affecting a useful slot angle 47 may include turbine engine design constraints and material limitations. A useful slot angle 47 may be less than about 90°. A preferred slot angle 47 may be less than about 60°. A more preferred slot angle 47 may be between about 20° and about 60°. The angled slot 25 allows attenuation of the circumferential static pressure variation of the hot gas flow 37 ingested into the shroud forward cavity 50 and the hot ingestion gas zone cavity 22. The result is an increase in effective back flow margin in the shroud cooling cavity 54 with respect to the static pressure at the flow exit end 56 of the dilution jet openings 26, as shown in FIG. 2, since the peak static pressure at the jet exit is reduced.

Figure 3:
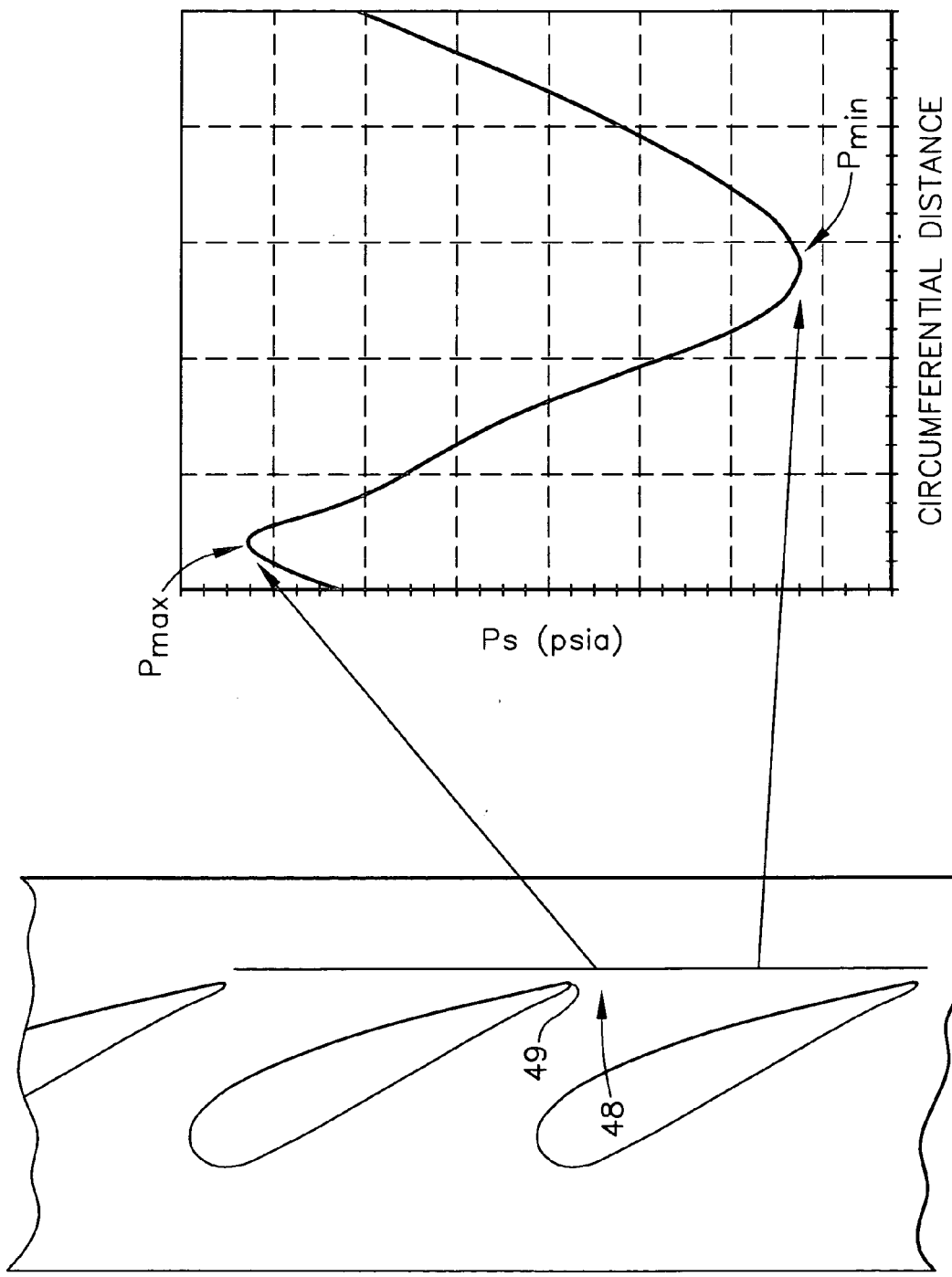
FIG. 3 is a static pressure distribution in a wake region according to one embodiment of the present invention.
Figure 4:
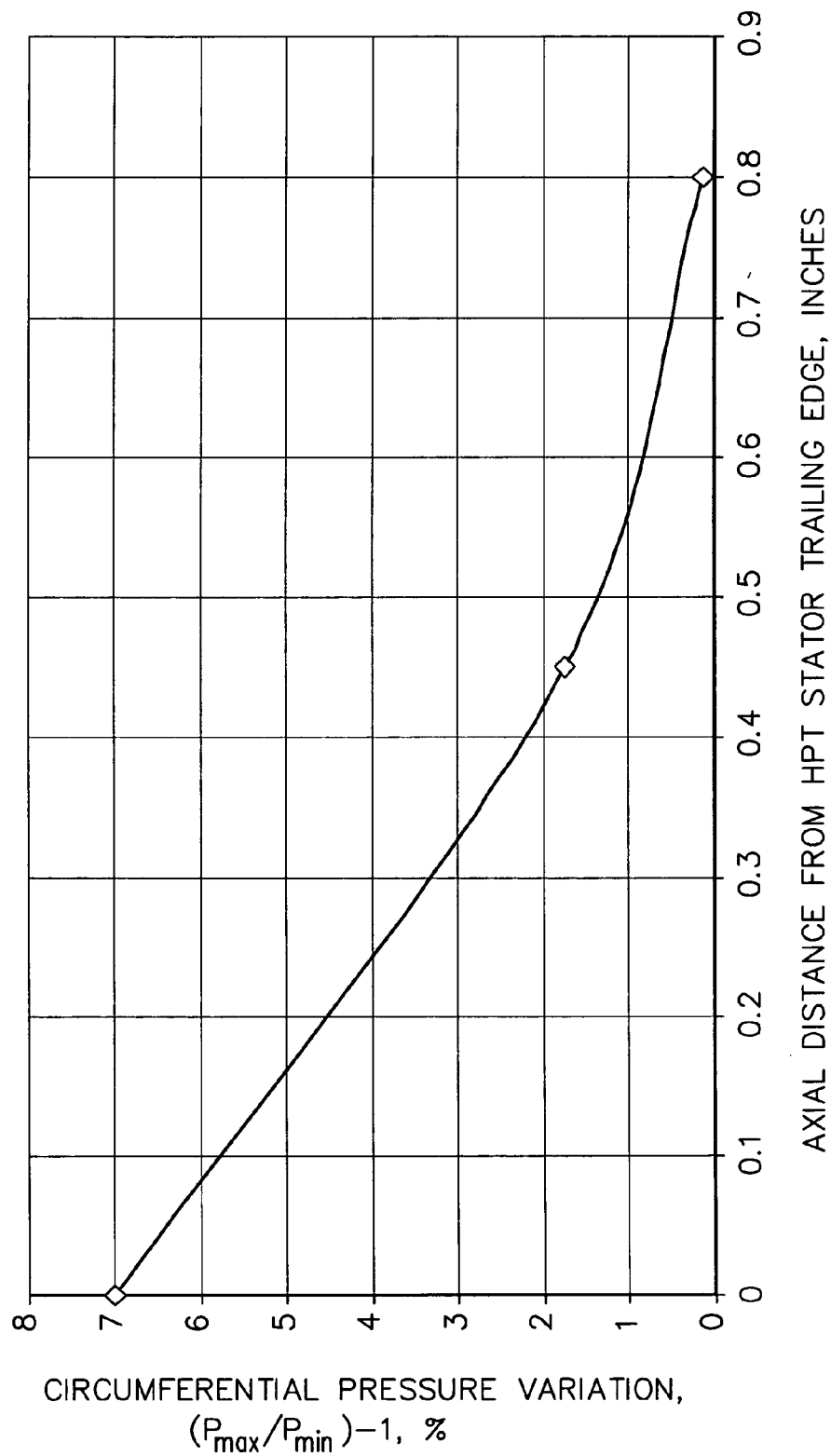
FIG. 4 is a plot of circumferential pressure variation as a function of axial distance from an airfoil trailing edge according to one embodiment of the present invention.
Figure 5:
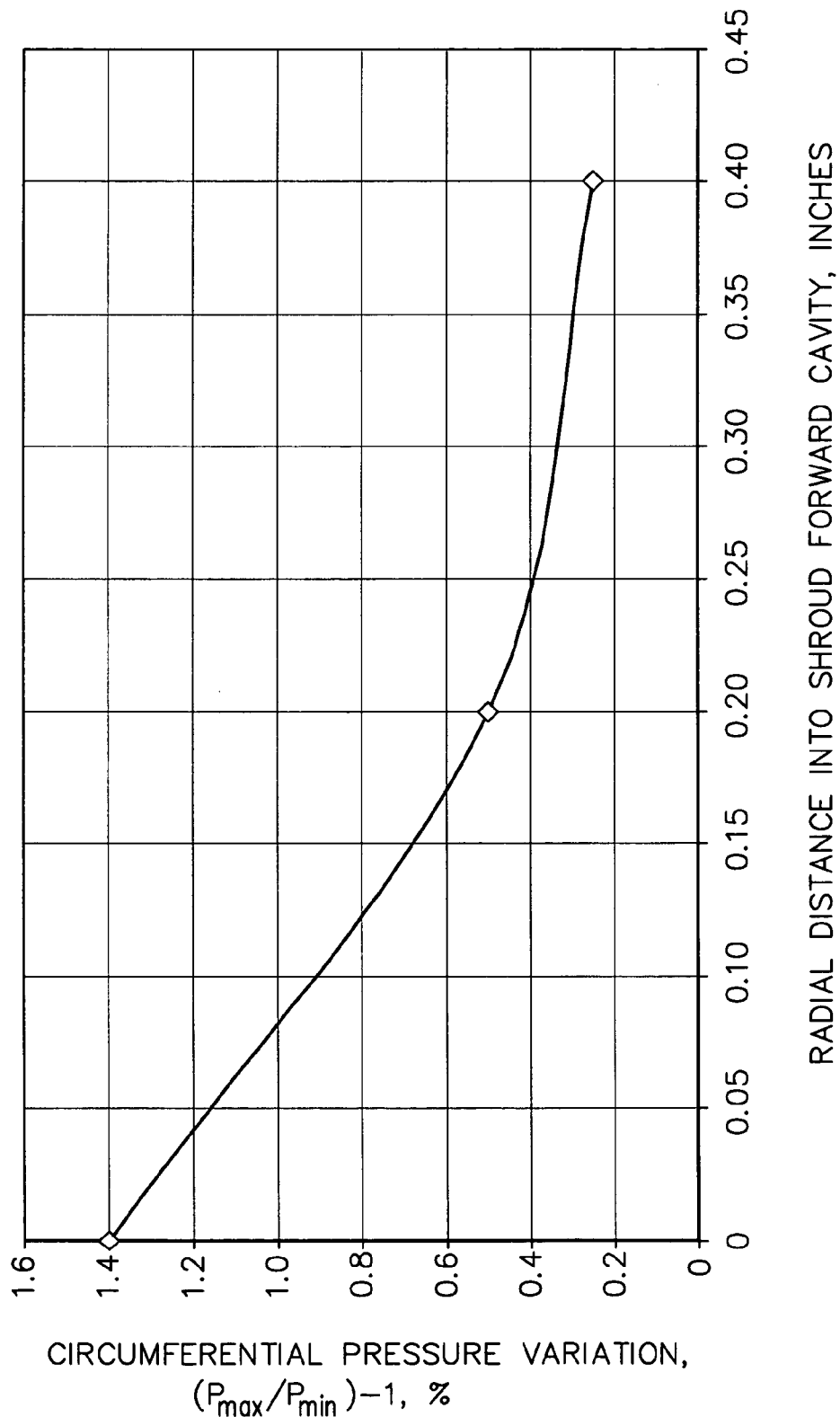
FIG. 5 is a plot of circumferential pressure variation as a function of radial distance into a shroud forward cavity according to one embodiment of the present invention.

The hot gas flow 37 ingested into the shroud forward cavity 50 may be driven by the circumferential pressure variation that occurs in a wake region 48 downstream of an airfoil trailing edge 49. A representative circumferential static pressure distribution in a wake region 48 is depicted in FIG. 3. As can be seen, the static pressure is higher in line with the airfoil trailing edge 49 wakes and lower away from the airfoil trailing edge 49 wakes. FIG. 4 is a plot of the circumferential static pressure variation as a function of axial distance from the airfoil trailing edge 49. As can be seen, the circumferential static pressure variation attenuates with axial distance. FIG. 5 is a plot of the circumferential static pressure variation as a function of radial distance into the shroud forward cavity 50. As can be seen, the circumferential static pressure variation attenuates with radial distance. Unlike the prior art, an angled slot 25 in conjunction with dilution jet openings 26 which exit into a recirculation forward cavity 50 and 21 and which are recessed radially from the flow path 38 and recessed axially from the shroud segment leading edge 39 will increase the effective axial and radial attenuation distance between the stator airfoil trailing edge wake regions 48 and the shroud dilution jet exits 56, thereby reducing the circumferential pressure variation at the dilution jet exits 56. Essentially, the angled slot 25 forces an axial change in momentum of the hot gas flow 37 as the hot gas flow 37 passes from the hot gas flow path 38 to the recirculation cavity 21. The axial change in momentum of the hot gas flow 37 results in less dynamic pressure recovery and further reduces the pressure variation. Because the axial change in momentum of the hot gas flow 37 also may increase the heat load to the leading edge 39 of the shroud segment 28, a thermal barrier coating (TBC) 29 may be utilized.

Thermal barrier coatings (TBC) 29 are known in the art and may be applied to the leading edge 39 of the shroud segments 28, as shown in FIGS. 1 and 2. A useful TBC 29 may be Zircoat (by PRAXAIR) and may be applied by plasma spray technique. The TBC 29 may provide thermal insulation against the hot gas flow 37 and may reduce the cooling requirement of the shroud segments 28. The hot gas flow 37 may impinge the TBC 29 on the leading edge 39 of the shroud segment 28, pass through the angled slot 25, enter the recirculation cavity 21, and contact a dilution jet cooling flow 40.

A dilution jet opening 26 may provide the dilution jet cooling flow 40. The dilution jet cooling flow 40 may dilute the hot gas flow 37 that enters the recirculation cavity 21, reducing the temperature of the hot gas flow 37 and reducing thermal distress to engine components caused by the hot gas flow 37. The forward hook 51 of the shroud segment 28 may have at least one dilution jet opening 26 there through. The forward hook 51 of the shroud segment 28 may be radially outward from a shroud segment forward lip 53 and forward of the shroud cooling cavity 54. For an embodiment wherein the recirculation cavity 21 is a shroud aft cavity 57, the aft end of the shroud segment 28 may have at least one dilution jet opening 26 there through. Cooling flow from the shroud cooling cavity 54 may pass through the dilution jet opening 26 to produce the dilution jet cooling flow 40. The cooled turbine shroud assembly 19 may comprise a plurality of dilution jet openings 26. As shown in FIG. 2, the dilution jet openings 26 may be positioned radially outward from and aft of the shroud segment forward lip 53. The dilution jet opening 26 may be positioned radially inward from and aft of a shroud carrier forward hook 52. By positioning the dilution jet openings 26 away from the leading edge 39 of the shroud segments 28, an axial and radial attenuation distance may be created which further reduces the pressure variation at a flow exit end 56 of the dilution jet openings 26. The reduction in pressure variation at the flow exit end 56 of the dilution jet opening 26 may result in an effective increase in back flow margin and improved shroud cooling.

In one embodiment of the present invention, at least one dilution jet opening 26 may be positioned circumferentially in line with each airfoil trailing edge 49 wake. For example, for a cooled turbine shroud assembly 19 having 30 stator airfoils 35, a cooled turbine shroud assembly 19 may comprise at least about 30 dilution jet openings 26. The preferred orientation for the dilution jet cooling flow 40 is to dilute the high pressure zones of the ingestion flow as the hot ingestion flow enters the recirculation cavity 21. Known methods of determining the circumferential high pressure zones include computational fluid dynamics (CFD) analyses, which can quantify the circumferential static pressure variation in the flow field as the hot flow path gas 37 travels from the stator airfoil trailing edge wake regions 48 into the shroud forward cavities 50 and 21. For some applications, due to engine design constraints, less than one dilution jet opening 26 per stator airfoil 35 may be useful. Methods for producing the dilution jet openings 26 are known in the art. Useful methods for forming the dilution jet openings 26 may include electrical discharge machining (EDM). EDM applications such as drilling by spark erosion may be useful for producing the dilution jet openings 26. The diameter of a useful dilution jet opening 26 may vary with cooled turbine shroud assembly 19 application. For example, for a high pressure turbine (HPT) shroud assembly, such as in a Honeywell TFE731-60 engine, a useful diameter of a dilution jet opening 26 may be about 0.02 inches. For some applications, the diameter of a useful dilution jet opening 26 may be between about 0.015 and about 0.050 inches.

The dilution jet openings 26 may be positioned such that they are at an angle to an axial engine centerline axis 45. For some applications, there may be a radial component to the angle such that the dilution jet cooling flow 40 may be directed toward the shroud carrier forward hook 52 or the shroud segment forward lip 53. The angle of the radial component may be between about 5° and about 45° and may increase cooling to the shroud carrier forward hook 52 or the shroud segment forward lip 53. There may be a tangential component to the angle such that the dilution jet cooling flow 40 may induce flow recirculation within the recirculation cavity 21. A tangential component to the angle may also be utilized to dilute the high pressure hot ingestion gases that penetrate the forward cavity. The angle of the tangential component may be between about 5° and about 60°. Computational fluid dynamics (CFD) analysis may be used for determining the orientation of preferred dilution jet openings 26. The preferred orientation may vary with application, engine design, and recirculation cavity 21 dimensions.

The recirculation cavity 21 may be a shroud forward cavity 50 that has been modified such that flow recirculation may be induced within the shroud forward cavity 50. The recirculation cavity 21 may be a shroud aft cavity 57 that has been modified such that flow recirculation may be induced within the shroud aft cavity 57. In some applications, the shroud carrier 33 and the stator retainer 30, as shown in FIG. 1, may form the recirculation cavity 21. For some applications, the recirculation cavity 21 may be formed in part by other engine components such as HPT nozzles (not shown) and stator outer diameter flanges (not shown). Any combination of engine components useful in forming a shroud forward cavity 50 or a shroud aft cavity 57 may be useful in forming a recirculation cavity 21. The recirculation cavity 21 may be capable of receiving a dilution jet cooling flow 40 and a hot gas flow 37. Within the recirculation cavity 21, the dilution jet cooling flow 40 may swirl together with the hot gas flow 37, reducing the temperature in a hot ingestion gas zone cavity 22. The recirculation cavity 21 may comprise a hot ingestion gas zone cavity 22. The recirculation cavity 21 may comprise a hot ingestion gas zone cavity 22 and a cool upper zone cavity 24. The recirculation cavity 21 may comprise a hot ingestion gas zone cavity 22, at least one warm middle zone cavity 23, and a cool upper zone cavity 24. A useful recirculation cavity 21 may depend on factors including application and engine design constraints.

The recirculation cavity 21 may comprise a plurality of surface modifications 55 such that flow recirculation may be induced in a hot ingestion gas zone cavity 22. The recirculation cavity 21 may comprise a plurality of surface modifications 55 such that flow recirculation may be induced in a warm middle zone cavity 23 and in a cooled upper zone cavity 24. Computational fluid dynamics (CFD) analysis may be used to determine the orientation and location of useful surface modifications 55. The dimensions of useful surface modifications 55 may depend on factors including application and engine design. For example, for a TFE731-60 engine, the surface modifications 55 may be fillets having a radius between about 0.02 inches and about 0.5 inches. Surface modifications 55 may include fillets and chamfers.

In one embodiment of the present invention, as shown in FIG. 2, the recirculation cavity 21 may comprise a hot ingestion gas zone cavity 22, a warm middle zone cavity 23, and a cool upper zone cavity 24. The recirculation cavity 21 may be capable of receiving a dilution jet cooling flow 40 and capable of dividing the dilution jet cooling flow 40 such that a first portion dilution jet cooling flow 41 and a second portion dilution jet cooling flow 42 are produced. One surface modification 55, such as a fillet, positioned forward of and in line with the dilution jet opening 26 may divide the dilution jet cooling flow 40 that enters the recirculation cavity 21 to produce the first portion dilution jet cooling flow 41 and the second portion dilution jet cooling flow 42. The first portion dilution jet cooling flow 41 may flow radially inward and enter a hot ingestion gas zone cavity 22 and the second portion dilution jet cooling flow 42 may flow radially outward and enter a warm middle zone cavity 23. The first portion dilution jet cooling flow 41 may swirl together with a hot gas flow 37, thus reducing the temperature in the hot ingestion gas zone cavity 22. This swirling together of the dilution jet cooling flow 41 with the hot gas flow 37 facilitates trapping the hot gas flow 37 near the hot gas flow path 38, thus urging the hot gas flow 37 back into the hot gas flow path 38. The second portion dilution jet cooling flow 42 may enter a warm middle zone cavity 23 and may be induced to recirculate by a second surface modification 55. The warm middle zone cavity 23 may reduce thermal distortion of the shroud carrier 33 and adjacent hardware. A seal leakage cooling flow 43 may enter a cool upper zone cavity 24 and may be induced to recirculate within the cool upper zone cavity 24. The seal leakage cooling flow 43 may be the leakage flow from a high pressure seal, such as a convoluted high pressure seal 31, radially outward from the shroud carrier 33. The cool upper zone cavity 24 may protect the high pressure seal from the hot gas flow 37. The recirculation cavity 21 may comprise a plurality of surface modifications 55. The number, location, and dimensions of useful surface modifications 55 may vary with application and may depend on the dimensions of the recirculation cavity 21. Useful surface modifications 55 may induce flow recirculation within the recirculation cavity 21. For an embodiment wherein the recirculation cavity 21 is a hot ingestion gas zone cavity 22, the seal leakage cooling flow 43 may enter the hot ingestion gas zone cavity 22. In this embodiment, the seal leakage cooling flow 43 may recirculate with the dilution jet cooling flow 40 and the hot gas flow 37.

Figure 6:
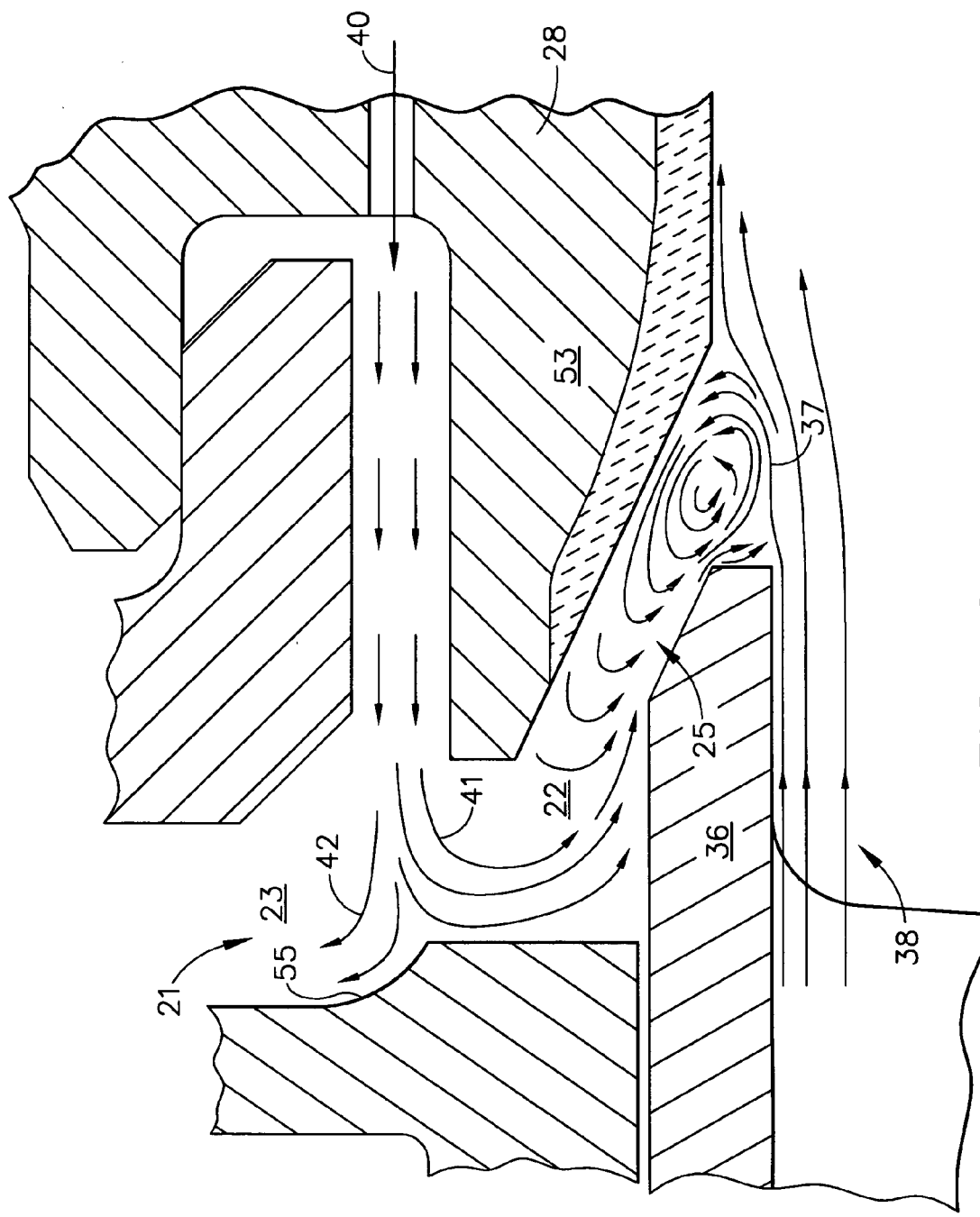
FIG. 6 is a computational fluid dynamics analysis of hot gas ingestion in an HPT shroud forward cavity according to one embodiment of the present invention.

FIG. 6 shows a computational fluid dynamics (CFD) analysis of the hot gas flow 37 ingestion of an embodiment of the present invention. As can be seen, the hot gas flow 37 may be trapped near the hot gas flow path 38. Additionally, the dilution jet openings 26 may be shielded from circumferential pressure variation. Further, the warm middle zone cavity 23 (partially shown) and the cool upper zone cavity 24 (not shown) may be shielded from the hot gas flow 37. CFD analysis results confirm that the shroud forward cavity can be adequately cooled using less forward cavity purge air than is required with the prior art.

Figure 7:
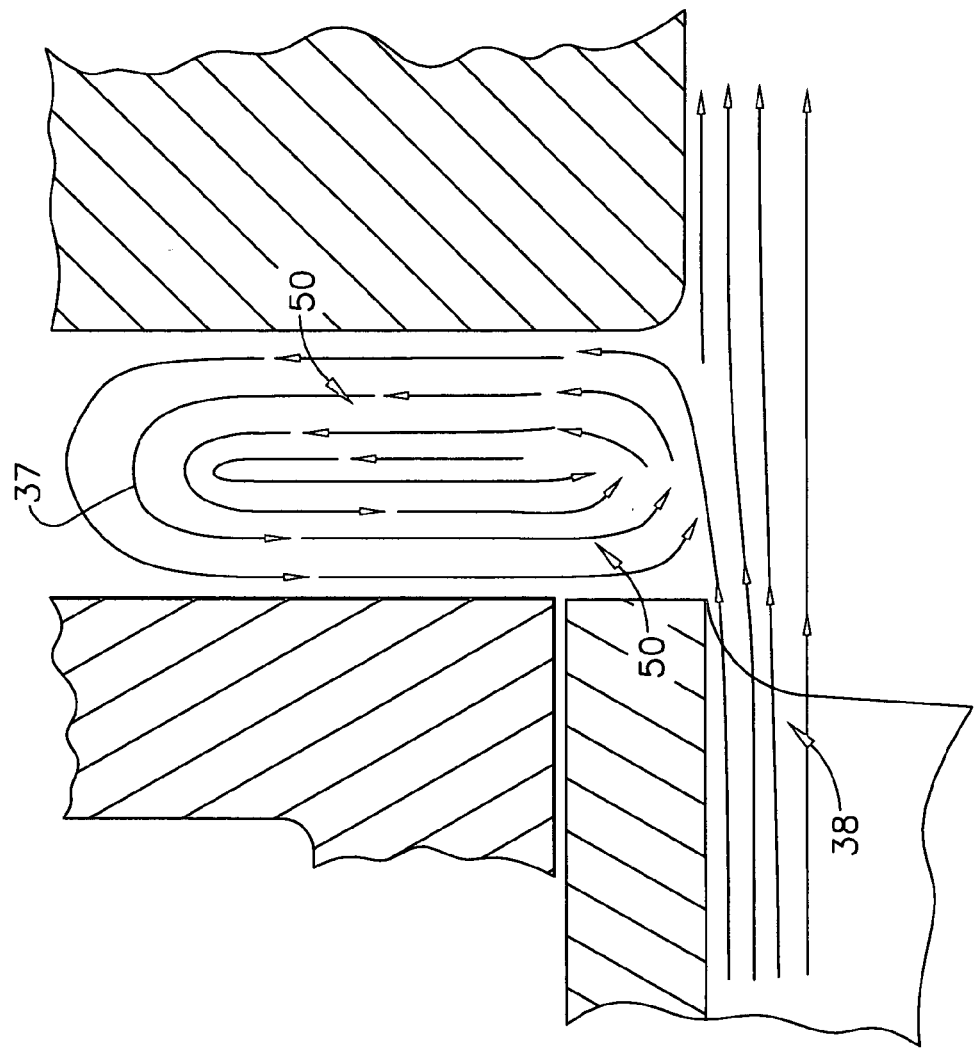
FIG. 7 is a computational fluid dynamics analysis of hot gas ingestion in a prior art HPT shroud forward cavity.

For comparison, a CFD analysis of a prior art shroud forward cavity 50 hot gas flow 37 ingestion is shown in FIG. 7. As can be seen, undiluted hot gas flow 37 penetrates far into the shroud forward cavity 50. The hot gas flow 37 may cause hardware distress such as cracking on the shroud carrier 33 and thermal distortion and oxidation distress of the shroud segments 28. This hardware distress may cause contact between the turbine blades 27 and the shroud segments 28, dislodging the shroud segments 28.

The cooled turbine shroud assembly 19 of the present invention may minimize cooling flows to turbine shroud assemblies. The cooled turbine shroud assemblies 19 may reduce cooling flow from the compressor from the prior art and may enable improvement in fuel consumption. The present invention may reduce hardware distress and maintenance costs associated with hot gas flow 37 ingestion at the shroud forward cavity 50 and the shroud aft cavity 57.

As can be appreciated by those skilled in the art, the present invention provides improved gas turbine cooled shroud assemblies and methods for their production. A cooled turbine shroud assembly 19 capable of protecting high pressure seals from the hot gas flow 37 and reducing thermal distortion of the shroud carrier 33 is provided. Also provided are cooled shroud assemblies 19 capable of significantly attenuating the dynamic pressure circumferential variation in the shroud forward cavity 50 that occurs due to the stator airfoil trailing edge wakes, reducing hot gas ingestion and improving the shroud assembly backflow margin at the dilution jet cooling hole exit. A robust high temperature cooled shroud assembly is provided that can operate in a higher temperature environment using less cooling flow than the prior art. The present invention provides a cooled shroud assembly 19 capable of trapping the ingested hot gas flow 37 near the hot gas flow path 38 and reducing the circumferential peak temperature in the shroud forward cavity 50 and 21. Also provided are cooled shroud assemblies 19 having improved cooling efficiency. Further, a cooled shroud assembly 19 capable of reducing hot gas flow 37 ingestion is provided.

It should be understood, of course, that the foregoing relates to preferred embodiments of the invention and that modifications may be made without departing from the spirit and scope of the invention as set forth in the following claims.

We claim:

1. A cooled shroud assembly for a turbine engine comprising:
   a recirculation cavity capable of recirculating a flow therein, said recirculation cavity positioned radially outward from a hot gas flow path through said turbine engine;
   at least one dilution jet opening in flow communication with said recirculation cavity; and
   an angled slot positioned radially inward from said recirculation cavity, said angled slot in flow communication with said recirculation cavity and said hot gas flow path.

2. The cooled shroud assembly of claim 1, wherein said recirculation cavity comprises a hot ingestion gas zone cavity.

3. The cooled shroud assembly of claim 1, wherein said recirculation cavity comprises a hot ingestion gas zone cavity and a cool upper zone cavity in flow communication with said hot ingestion gas zone cavity.

4. The cooled shroud assembly of claim 3, wherein said recirculation cavity further comprises at least one warm middle zone cavity positioned between and in flow communication with said hot ingestion gas zone cavity and said cool upper zone cavity.

5. The cooled shroud assembly of claim 1, wherein said angled slot has a slot angle of less than about 600.

6. The cooled shroud assembly of claim 1, wherein said angled slot has a slot angle between about 20° and about 600.

7. The cooled shroud assembly of claim 1, wherein said at least one dilution jet opening is positioned circumferentially in line with an airfoil trailing edge wake of said turbine engine.

8. The cooled shroud assembly of claim 1, wherein said at least one dilution jet opening has a diameter between about 0.015 and about 0.050 inches.

9. The cooled shroud assembly of claim 1, wherein said recirculation cavity is a shroud forward cavity.

10. The cooled shroud assembly of claim 1, further comprising a surface modification positioned in line with said dilution jet opening such that said surface modification is capable of dividing a dilution jet cooling flow from said dilution jet opening.

11. An apparatus for a turbine engine comprising:
    a hot ingestion gas zone cavity positioned radially outward from a hot gas flow path through said turbine engine;
    at least one warm middle zone cavity positioned radially outward from and in flow communication with said hot ingestion gas zone cavity;
    a cool upper zone cavity positioned radially outward from and in flow communication with said at least one warm middle zone cavity;
    an angled slot positioned radially inward from said hot ingestion gas zone cavity, said angled slot in flow communication with said hot ingestion gas zone cavity and said hot gas flow path; and
    a plurality of dilution jet openings positioned radially outward from said angled slot and in flow communication with said at least one warm middle zone cavity.

12. The apparatus of claim 11, wherein said turbine engine has a plurality of airfoils, and wherein said plurality of dilution jet openings are positioned such that at least one said dilution jet opening is positioned circumferentially in line with each airfoil trailing edge wake.

13. The apparatus of claim 11, wherein said hot ingestion gas zone cavity, said at least one warm middle zone cavity, and said cool upper zone cavity define a shroud forward cavity.

14. The apparatus of claim 13, further comprising a plurality of surface modifications positioned in contact with said shroud forward cavity, such that said surface modifications are capable of inducing flow recirculation within said shroud forward cavity.

15. The apparatus of claim 14, wherein said plurality of surface modifications are fillets having a radius between about 0.02 inches and about 0.5 inches.

16. The apparatus of claim 11, wherein said hot ingestion gas zone cavity, said at least one warm middle zone cavity, and cool upper zone cavity define a shroud aft cavity.

17. The apparatus of claim 11, wherein said turbine engine has a plurality of shroud segment leading edges, further comprising a thermal barrier coating (TBC) in contact with said plurality of shroud segment leading edges.

18. An assembly for a turbine engine comprising:
    a recirculation cavity having a hot ingestion gas zone cavity, a warm middle zone cavity, and a cool upper zone cavity, said recirculation cavity positioned radially outward from a hot gas flow path through said turbine engine;

a plurality of dilution jet openings positioned aft of and in flow communication with said recirculation cavity; and an angled slot in flow communication with said recirculation cavity and said hot gas flow path, said angled slot positioned radially inward from said recirculation cavity.

19. The assembly of claim 18, wherein said angled slot has a slot angle of less than about 600.

20. The assembly of claim 18, wherein said turbine engine has a hot gas flow there through, and wherein said plurality of dilution jet openings are positioned such that a dilution jet cooling flow there through is capable of inducing flow recirculation of a portion of said hot gas flow.

21. The assembly of claim 18, wherein a distance between a flow exit end of one said dilution jet opening and said recirculation cavity is at least about 0.2 inches.

22. A turbine shroud assembly for a turbine engine having a plurality of airfoils comprising:

a hot ingestion gas zone cavity positioned radially outward from a hot gas flow path through said turbine engine;

a warm middle zone cavity positioned radially outward from and in flow communication with said hot ingestion gas zone cavity;

a cool upper zone cavity positioned radially outward from and in flow communication with said warm middle zone cavity;

an angled slot positioned radially inward from said hot ingestion gas zone cavity, said angled slot in flow communication with said hot ingestion gas zone cavity and said hot gas flow path, said angled slot having a slot angle between about 200 and about 60°; and a plurality of dilution jet openings positioned radially outward from said angled slot and in flow communication with said warm middle zone cavity, at least one said dilution jet opening positioned circumferentially in line with a trailing edge wake of each said airfoil, and wherein a distance between a flow exit end of each said dilution jet opening and said hot ingestion gas zone cavity is at least about 0.2 inches.

23. A method of shielding a turbine engine from a hot gas flow path there through comprising the steps of:

providing a hot ingestion gas zone cavity radially outward from said hot gas flow path;

positioning at least one dilution jet opening in flow communication with a shroud cooling cavity of said turbine engine and said hot ingestion gas zone cavity, such that flow recirculation is induced within said hot ingestion gas zone cavity during operation of said turbine engine; and positioning an angled slot between and in flow communication with said hot ingestion gas zone cavity and said hot gas flow path.

24. The method of claim 23, further comprising a step of positioning a cool upper zone cavity radially outward from and in flow communication with said hot ingestion gas zone.

25. The method of claim 24, wherein said turbine engine has a high pressure seal in flow communication with said cool upper zone cavity, and wherein said cool upper zone cavity is capable of recirculating a seal leakage cooling flow from said high pressure seal.

26. The method of claim 24, further comprising a step of positioning at least one warm middle zone cavity between and in flow communication with said hot ingestion gas zone and said cool upper zone cavity.

27. The method of claim 23, wherein said at least one dilution jet opening is positioned circumferentially in line with an airfoil trailing edge wake of said turbine engine.

28. The method of claim 23, wherein said at least one dilution jet opening has a diameter between about 0.015 and about 0.050 inches.

* * * * *

UNITED STATES PATENT AND TRADEMARK OFFICE
CERTIFICATE OF CORRECTION

PATENT NO. : 6,942,445 B2
APPLICATION NO. : 10/729695
DATED : September 13, 2005
INVENTOR(S) : Morris et al.

It is certified that error appears in the above-identified patent and that said Letters Patent is hereby corrected as shown below:

Column 10, line 2, "600" should be changed to --60°--;
Column 10, line 5, "600" should be changed to --60°--;
Column 11, line 8, "600" should be changed to --60°--;
Column 11, line 32, "200" should be changed to --20°--.

Signed and Sealed this

Tenth Day of April, 2007

JON W. DUDAS
*Director of the United States Patent and Trademark Office*